Patented July 16, 1935

2,008,491

UNITED STATES PATENT OFFICE 2,008,491

POLYMERIZATION OF DIOLEFINES

Georg Ebert, Friedrich August Fries, and Paul Garbsch, Ludwigshafen-on-the-Rhine, Germany, assignors to I. G. Farbenindustrie Aktiengesellschaft, Frankfort-on-the-Main, Germany No Drawing. Application June 23, 1930, Serial No. 463,352. In Germany May 29, 1929

9 Claims. (Cl. 260—6)

This application is a continuation-in-part of the application for Letters Patent Serial No. 454,507 filed May 21, 1930.

The present invention relates to improvements in the polymerization of diolefines.

It is already known that in the polymerization of diolefines, such as butadiene, dimethylbutadiene or isoprene or homologues or analogues thereof, or mixtures thereof with the aid of alkali metals, such as sodium or potassium or lithium, the reaction frequently suffers delays and proceeds in an irregular manner and that it is difficult to regulate the reaction in a convenient manner. Different methods have been adopted in trying to obviate this difficulty, for example the addition of solvents, such as large quantities of aliphatic ethers of low boiling point or of small quantities of cyclic di-ethers.

We have found that a polymerization which commences rapidly and proceeds particularly quietly and uniformly is obtained by operating with an addition of compounds capable of reacting with triphenyl-methyl sodium, whereby said sodium is removed from the triphenyl-methyl sodium.

Those substances which do not react with alkali metals or only react slowly compared with the rate of their reaction with triphenyl methyl sodium and which effect a replacement of the metal atom by hydrogen atoms or organic groups are especially useful.

As examples of such compounds capable of reacting with triphenyl methyl sodium may be mentioned unsaturated ethers having an olefinic double carbon bond in the molecule, organic sulphur compounds of the said nature, such as hydrosulphides, thiophene or hydrocyanic acid, acrylic acid nitrile, benzyl cyanide or methylacetylene.

As examples of the said unsaturated ethers having an olefinic double carbon bond in the molecule may be mentioned aliphatic ethers, such as vinyl ethyl ether, vinyl isopropyl ether, vinyl butyl ether or allyl ether and further mixed aromatic aliphatic ethers, such as α-phenylvinyl ethyl ether having the formula

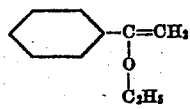

or mixed aliphatic hydroaromatic ethers of unsaturated nature.

The said additional compounds are as a rule added in small amounts relative to the amount of the diolefine to be polymerized for example in amounts of up to about 20 per cent by weight of the diolefine to be polymerized but preferably in smaller amounts, such for example as between 0.01 and 5 per cent. Even an addition of a few hundredths of a per cent will often give the desired effect. The amounts of the said compounds added may of course also be greater than those specified, but such additions of larger amounts do not usually give rise to a corresponding increase in the beneficial effect, and may therefore not be very economical. The reaction in accordance with the present invention proceeds smoothly and uniformly with the formation of a polymerization product of excellent homogeneity which may be readily worked up and which yields excellent soft rubber vulcanization products. If the amount of additional substances is increased to a multiple a polymerization product is obtained which is very soft and plastic and which in appearance is very similar to well masticated rubber. If the amount of additional substances is increased still further oily substances are formed and the polymerization proceeds smoothly. Thus it is possible to influence the viscosity and other properties of the resulting polymerization products to a very great extent simply by varying the amounts of additional substances added, the amounts being so small, however, that their removal after the polymerization is generally speaking not necessary.

Several of the said additional substances may also be employed simultaneously.

Organic solvents which do not react with alkali metals may also be employed in the polymerization in accordance with the present invention, such as liquid hydrocarbons, as for example gasoline, benzine, benzene, petrol ether or cyclohexane, or ethers, such as methyl ether or ethyl ether and the like.

The temperatures employed in the polymerization are capable of wide variation and will usually range between 0° and 150° C. The most advantageous temperatures lie between room temperature and 80° C. or up to 100° C.

The polymerization is usually carried out with the aid of metallic polymerizing agents, such as alkali metals or alkaline earth metals or alloys containing the said metals or with alkali metal hydrides or organo-metallic compounds.

The resulting polymerization products are eminently suitable for a great variety of purposes as for example for the preparation of products similar to soft rubber and having excellent properties as regards strength or of hard rubber products or similar masses or of artificial silk, artificial wool, coatings, films, lacquers and the like. They may be converted into other highly valuable products by hardening or other subsequent treatments.

The following examples will further illustrate how the invention is carried out in practice, but the invention is not restricted thereto. The parts are by weight.

Example 1

100 parts of butadiene and 1 part of vinyl ethyl ether are caused to react in a pressure-tight tinned iron autoclave with 0.25 part of sodium. The temperature amounts to about 40° C.; the polymerization commences immediately and is completed after about 1½ days. The product obtained yields excellent products when vulcanized.

Example 2

500 parts of butadiene are polymerized together with 2 parts of sodium in the presence of 5 parts of ethyl propenyl ether. The reaction proceeds very smoothly and is completed in about 3½ days at a temperature of about 40° C. A polymerization product is obtained which can be readily worked up on rollers and which is very suitable for the production of soft resilient vulcanization products.

Example 3

1000 parts of butadiene to which 10 parts of vinyl isopropyl ether have been added are polymerized with the aid of 4 parts of sodium. The reaction proceeds very smoothly and is completed in about 3 days at a temperature of about 40° C., a polymerization product of good plasticity being thus obtained. It furnishes solutions of medium viscosity and can be worked up into soft elastic vulcanization products of good tensile strength.

Example 4

A mixture of 1000 parts of butadiene with 10 parts of allyl ethyl ether is polymerized with the aid of 4 parts of sodium in a rotary autoclave at a temperature of about 40° C. The polymerization proceeds extremely smoothly and uniformly. A good plastic polymerization product is obtained which is very suitable for the production of hardened masses.

Example 5

0.5 part of propargyl ethyl ether is admixed with 500 parts of butadiene and the mixture is subjected to polymerization at a temperature of about 40° C. with 2 parts of sodium in an iron autoclave. After 3 days of a smooth quiet reaction a product of medium hardness is obtained which is very suitable for the production of soft resilient vulcanization products.

Example 6

A mixture of 800 parts of butadiene and 16 parts of α-phenylvinyl ethyl ether is polymerized at a temperature of about 40° C. together with 3.2 parts of sodium in a rotary autoclave during a period of 3 days. The polymerization proceeds in a very smooth and uniform manner and furnishes a polymerization product of high tackiness which is very suitable for the production of coatings and films.

Example 7

100 parts of butadiene together with 1 part of vinyl m-cresyl ether or 1 part of vinyl o-cresyl ether and 0.4 part of sodium are subjected to polymerization at a temperature of about 40° C. An extremely homogeneous and very plastic product is obtained in a quiet and smooth reaction, the solution of which product in benzene has a low viscosity and which product is very suitable for the production of rayon or artificial wool.

Example 8

A mixture of 1000 parts of butadiene and 10 parts of vinyl-α-naphthyl ether or 5 parts of vinyl-β-naphthyl ether is polymerized at a temperature of about 40° C. together with 4 parts of sodium in a rotary autoclave. The polymerization proceeds very quietly and smoothly and is completed in about 2½ days. Very good soft resilient vulcanizates can be obtained from the said product.

Example 9

100 parts of butadiene to which 0.2 part of sodium wire having a diameter of 1.2 millimetres and 0.2 part of cyclohexenyl-(Δ-2.3)-ethyl ether have been added are polymerized in a rotary autoclave for about 5 days at a temperature of about 30° C. The polymerization proceeds very quietly. The polymerization product is homogeneous and very stringy.

A product having similar properties may be obtained already in 4 days if besides the substances above mentioned 0.2 part of dioxane be added.

Example 10

100 parts of butadiene are polymerized together with 0.2 part of sodium wire 1.2 millimetres in diameter and with 0.07 part of furane in a rotary autoclave at 30° C. for a period of 3 days. A very stringy resilient homogeneous polymerizate is obtained in a very smooth reaction.

If more furane is added the polymerization product becomes more plastic. Thus polymerization products, which are obtained under otherwise same conditions, with an addition of 0.25 part of furane are only very little stringy. Again the polymerization product obtained with an addition of 1 part of furane is soft.

Example 11

1000 parts of butadiene are polymerized at a temperature of about 50° C. with the aid of 4 parts of sodium for 1½ days in a rotating autoclave in the presence of 0.3 part of thiophene. The reaction proceeds very quietly. A homogeneous product having a good plasticity is obtained which may be excellently further worked up. According to the amount of thiophene added polymerization products of various degrees of polymerization are obtained which are readily soluble in benzene and the relative viscosity of solutions of which in benzene having the same concentration falls as the amount of thiophene added during the polymerization is increased. For example, if 1000 parts of butadiene are polymerized in the presence of 20 parts of thiophene and 8 parts of sodium an oily polymerization product is obtained after quiet and uniform reaction lasting from about 2 to 3 days.

Example 12

1000 parts of butadiene are polymerized at a temperature of about 50° C. with the aid of 4 parts of sodium in the presence of 0.5 part of hydrocyanic acid. The reaction proceeds quietly and uniformly and is completed in 1½ days. A polymerization product is obtained which may be excellently worked up by reason of its homogeneity and good plastic properties.

Example 13

If 1000 parts of butadiene are polymerized at a temperature of about 40° C. in a rotating autoclave with the aid of 4 parts of sodium in the presence of 10 parts of acrylic acid nitrile a plastic product which may be worked up excellently is obtained after a quiet polymerization lasting 16 hours.

Example 14

1000 parts of butadiene are polymerized at a temperature of about 50° C. in a rotating autoclave with the aid of 4 parts of sodium in the presence of 0.7 part of benzyl cyanide. The reaction which proceeds very uniformly and is ended in about 2 days yields a product having excellent properties.

Example 15

If 1000 parts of butadiene are polymerized at a temperature of 50° C. with the aid of 4 parts of sodium with an addition of 1 part of methylacetylene, the polymerization proceeds quietly and uniformly and is completed after 2 days. A plastic product is obtained which may be readily further worked up.

What we claim is:

1. In the production of polymerization products of a diolefine, the step of polymerizing said diolefine in contact with an alkali metal and an unsaturated ether having an olefinic double carbon bond in the molecule.

2. In the production of polymerization products of a diolefine, the step of polymerizing said diolefine in contact with an alkali metal and an unsaturated ether having an olefinic double carbon bond in the molecule at a temperature of between 0° and 150° C.

3. In the production of polymerization products of a diolefine, the step of polymerizing said diolefine in contact with an alkali metal and an unsaturated ether having an olefinic double carbon bond in the molecule at a temperature of between room temperature and 80° C.

4. In the production of polymerization products of a diolefine, the step of polymerizing said diolefine in contact with an alkali metal and an aliphatic unsaturated ether.

5. In the production of polymerization products of a diolefine, the step of polymerizing said diolefine in contact with an alkali metal and 20 per cent by weight of an unsaturated ether having an olefinic double carbon bond in the molecule based on the weight of the diolefine to be polymerized.

6. In the production of polymerization products of a diolefine, the step of polymerizing said diolefine in contact with an alkali metal and between 0.01 and 5 per cent by weight of an unsaturated ether having an olefinic double carbon bond in the molecule based on the weight of the diolefine to be polymerized.

7. In the production of polymerization products of a diolefine, the step of polymerizing said diolefine in contact with an alkali metal and a vinyl ether.

8. A process for the polymerization of butadiene, which comprises adding 1 per cent by weight of a vinyl ether to butadiene, and polymerizing with sodium at a temperature of about 40° C.

9. In the production of polymerization products of a diolefine, the step of polymerizing said olefine in contact with an alkali metal and a compound which is capable of reacting with triphenyl methyl sodium so that sodium is removed from the triphenyl methyl sodium, but which reacts with alkali metals at the most slowly compared with the rate of its reaction with triphenyl methyl sodium and which is selected from the class consisting of unsaturated ethers having an olefinic double carbon bond in the molecule, organic hydrosulphides, thiophene, hydrocyanic acid, acrylic acid nitrile, benzyl cyanide, and methyl acetylene.

GEORG EBERT.
FRIEDRICH AUGUST FRIES.
PAUL GARBSCH.